United States Patent Office 3,577,471
Patented May 4, 1971

3,577,471
HALOGEN INTERCHANGE PROCESS
John G. McNulty and William L. Walsh, Glenshaw, Pa., assignors to Gulf Research & Development Company, Pittsburgh, Pa.
No Drawing. Filed Feb. 1, 1968, Ser. No. 702,214
Int. Cl. C07c 21/02
U.S. Cl. 260—656                                      5 Claims

ABSTRACT OF THE DISCLOSURE

Halides can be made to undergo transhalogenation in a process wherein two compounds containing different halogen substituents are contacted at elevated temperatures. By this process, organic halides, such as vinyl bromide and dibromoethane, can be directly converted to vinyl chloride by contact with a suitable halide such as hydrogen chloride. Ethylene, which is easily brominated, can thus readily be converted to vinyl chloride.

BACKGROUND OF THE INVENTION

It is frequently desirable, in synthesizing chemicals, to directly convert a compound containing a first halide into a corresponding compound wherein said first halide has been replaced with a second halide in a simple, efficient manner. Unfortunately, when such conversion has been accomplished to date it has only been accomplished with difficulty, involving intricate and expensive equipment, requiring long reaction periods and with low yields. In the preparation of vinyl chloride, for example, the steps of oxidation of hydrogen chloride to obtain chlorine, chlorination of ethylene to the corresponding dichloride and dehydrochlorination of the latter to vinyl chloride have been employed. Direct transhalogenation, particularly in the case of vinyl halides, is unknown, since it is believed that the halogenation substituents of the vinyl halides are particularly inert as a result of resonance involving a polarized structure. By following the practice of the invention described and claimed below, it is possible to directly interchange one halogen atom for another in various compounds in a process requiring simple equipment, affording good yields and high efficiencies and which additionally has no deleterious effect on the reacting substances. In another aspect of this invention, it is possible to directly convert an organic halide, including vinyl halides such as vinyl bromide, to a different halide such as vinyl chloride. In yet another embodiment, ethylene can thus be readily converted to vinyl chloride in a relatively simple fashion.

SUMMARY OF THE INVENTION

We have made the surprising discovery that when two halogen compounds, each containing different halogen substituents, are brought into contact at elevated temperatures, they can be made to exchange their halogen substituents. This is particularly surprising in view of the fact that many of the compounds which have been found to undergo such transhalogenation are considered to be stable, in that the halogen substituent is considered to be relatively unreactive. It is known, for example, that the vinyl halides are peculiarly unreactive, demonstrating definitely diminished reactivity as compared with the halogen of the corresponding saturated alkyl halide. The deactivating effect of direct attachment to a double bond is usually explained on the basis of the resonance effect of the molecule, whereby the carbon-halogen bond is shorter than a normal carbon-halogen bond and the halogen is thus rendered less labile. In spite of the expected stability of such compounds, we have found that the halogen substituent can be readily replaced by a different halogen atom with surprising efficiency. This halogen interchange is quite simply effected by contacting the desired halides with each other at elevated temperatures, as will be more fully discussed hereinafter.

As suitable halogen compounds that can be made to interchange in the manner defined herein we can use, as a first halide, alkyl halides containing from 2 to about 14 carbon atoms, alkenyl halides containing from 2 to about 14 carbon atoms and the aromatic halides. Specific examples of the alkyl halides include the ethyl halides, n-propyl and isopropyl halides, n-butyl, isobutyl and secondary butyl halides, n-pentyl, isopentyl and secondary pentyl halides, n-hexyl, isohexyl and secondary hexyl halides, n-heptyl, isoheptyl and secondary heptyl halides, n-octyl, isooctyl and secondary octyl halides, n-nonyl, isononyl and secondary nonyl halides, n-decyl, isodecyl and secondary decyl halides, undecyl, isoundecyl and secondary undecyl halides, dodecyl, isododecyl and secondary dodecyl halides, tridecyl, isotridecyl and secondary tridecyl halides, tetradecyl, isotetradecyl and secondary tetradecyl halides. The halogen substituent on these alkyl halides can be selected from among chlorine, bromine and iodine. Examples of the alkenyl halides useful in the interchange process are vinyl chloride, vinyl bromide,

| | |
|---|---|
| 1-chloropropene-1, | 2-chloroheptene-1, |
| 2-chloropropene-1, | 3-chloroheptene-3, |
| 1-bromopropene-1, | 1-bromoheptene-1, |
| 2-bromopropene-1, | 2-bromoheptene-1, |
| 1-chlorobutene-1, | 3-bromoheptene-3, |
| 2-chlorobutene-1, | 1-chlorodecene-1, |
| 2-chlorobutene-2, | 2-chlorodecene-1, |
| 1-bromobutene-1, | 5-chlorodecene-5, |
| 2-bromobutene-1, | 1-bromodecene-1, |
| 2-bromobutene-2, | 2-bromodecene-1, |
| 1-chloropentene-1, | 5-bromodecene-5, |
| 2-chloropentene-1, | 1-chloroundecene-1, |
| 2-chloropentene-2, | 2-chloroundecene-1, |
| 1-bromopentene-1, | 5-chloroundecene-5, |
| 2-bromopentene-1, | 1-bromoundecene-1, |
| 2-bromopentene-2, | 2-bromoundecene-1, |
| 1-chlorohexene-1, | 5-bromoundecene-5, |
| 2-chlorohexene-1, | 1-chlorododecene-1, |
| 3-chlorohexene-3, | 2-chlorododecene-1, |
| 1-bromohexene-1, | 6-chlorododecene-6, |
| 2-bromohexene-1, | 1-bromododecene-1, |
| 3-bromohexene-3, | 2-bromododecene-1, |
| 1-chlorooctene-1, | 6-bromododecene-6, |
| 2-chlorooctene-1, | 1-chlorotridecene-1, |
| 4-chlorooctene-4, | 2-chlorotridecene-1, |
| 1-bromooctene-1, | 6-chlorotridecene-6, |
| 2-bromooctene-1, | 1-bromotridecene-1, |
| 4-bromooctene-4, | 2-bromotridecene-1, |
| 1-chlorononene-1, | 6-bromotridecene-6, |
| 2-chlorononene-1, | 1-chlorotetradecene-1, |
| 4-chlorononene-4, | 2-chlorotetradecene-1, |
| 1-bromononene-1, | 7-chlorotetradecene-7, |
| 2-bromononene-1, | 1-bromotetradecene-1, |
| 4-bromononene-4, | 2-bromotetradecene-1, |
| 1-chloroheptene-1, | 7-bromotetradecene-7, | allyl chloride, allyl bromide, allyl iodide, crotyl chloride, crotyl bromide, crotyl iodide, methylallyl chloride, methylallyl bromide, methylallyl iodide, 3,3-dimethylallyl chloride, 3,3-dimethylallyl bromide and 3,3-dimethylallyl iodide. Exemplary of useful aromatic halides are chlorobenzene, bromobenzene, iodobenzene, orthochlorotoluene, meta-chlorotoluene, para-chlorotoluene, ortho-bromotoluene, meta-bromotoluene, para-bromotoluene, ortho-iodotoluene, meta - iodotoluene, para - iodotoluene, 1-chloro - 2,3 - dimethylbenzene, 1 - chloro - 2,6 - dimethylbenzene, 1 - chloro - 3,4 - dimethylbenzene, 1 - chloro - 2,4 - dimethylbenzene, 1 - chloro-3,5-dimethylbenzene, 1-chloro-2,5-dimethylbenzene, 1-bromo - 2,3 - dimethylbenzene, 1-bromo-2,6-dimethylbenzene, 1-bromo-3,4-dimethylbenzene, 1-bromo-2,4-dimethylbenzene, 1-bromo-3,5-dimethylbenzene, 1 - bromo - 2,5 - dimethylbenezne, 1-iodo-2,3-dimethylbenzene, 1-iodo-2,6-dimethylbenzene, 1-iodo-3,4-dimethylbenzene, 1-iodo-2,4-dimethylbenzene, 1-iodo-3,5-dimethylbenzene, 1-iodo - 2,5 - dimethylbenzene, orthochloroethylbenzene, meta-chloroethylbenzene, para-chloroethylbenzene, ortho-bromoethylbenzene, meta-bromoethylbenzene, para-bromoethylbenzene, ortho-iodobenzene, meta-iodobenzene, and para-iodobenzene. In addition to the compounds set forth above one can also successfully interchange halogen with the saturated and unsaturated cyclic halides, multiaromatic compounds such as the polyphenyl halides, polynuclear and condensed ring compounds such as the halides of naphthalene, phenanthrene and anthracene. Also useful are the five and six membered heterocyclic halides such as the derivatives of furan, thiophene, pyrrole, pyridine and coumarone. The limiting factors regarding the choice of the halide compound are that the compounds be thermally stable at the reaction temperatures of the process and that any compounds which are solids be melted or otherwise solubilized. It should be noted at this point that the number of halogen substituents on the molecule is not critical, although numerous substituents might present problems regarding complete substitution due to statistical factors.

As a second halogen compound useful for interchange with the first halogen compounds described above, we can use inorganic halides, including the hydrogen halides, alkali metal halides and alkaline earth metal halides. These halides, as well as those of the first group of halides defined above are typically selected from chlorine and bromine, which are preferred. As indicated above, the iodine compounds are frequently useful but their relative expense makes them less desirable than the corresponding chloride and bromide. The fluorides are apparently too unreactive at the conditions contemplated within the scope of this invention to be useful. Exemplary of the compounds useful as the second halogen compound are hydrogen chloride, hydrogen bromide, lithium chloride, lithium bromide, lithium iodide, sodium chloride, sodium bromide, sodium iodide, potassium chloride, potassium bromide, potassium iodide, magnesium chloride, magnesium bromide, magnesium iodide, calcium chloride, calcium bromide, calcium iodide, barium chloride, barium bromide, barium iodide, strontium chloride, strontium bromide and strontium iodide.

The reaction can be conducted in any convenient reaction vessel that will effect efficient contact between the reactants. One result of the relative ease of reaction is the simplicity of equipment required. In a preferred embodiment a simple tubular reactor, which can be made of glass or steel and which can be packed with glass helices, Raschig rings, glass chips, etc., is used. We prefer to use an unpacked tube of either heat resistant glass or steel. Materials sold under the trade names of Pyrex and Vycor have been found quite suitable for the glass tube. In many cases the use of glass simplifies corrosion problems and may therefore be preferred, but in any event, the type of reactor is not critical within the contemplation of this invention. Another advantage of using a simple tube is that such a reactor is eminently suited for continuous operation.

The useful temperature range, broadly, is from that temperature sufficient to cause the compounds to exchange halogen to that temperature at which undesirable carbonization and coking begin to occur. The latter is a function of the thermal stability of the particular molecule involved. The temperature can thus range from as low as about 200° C. to as high as about 600° C. We prefer, however, to use temperatures ranging from about 250° to about 500° C. As will be seen from the examples, the temperature does not appear to be critical and good results are attainable throughout this entire range of temperatures. The pressure can range from about 1 atm. to about 50 atm., although it is preferred to operate at atmospheric pressures. In some cases it may be desirable to carry out the reaction at elevated conditions of temperature and pressure so that the reactants are in the liquid state. Such procedure, although not a preferred embodiment of the invention, can be used successfully. Contact time is not critical and can be from about 1 to about 300 seconds, preferably from about 5 to about 30 seconds.

The halogen interchange reaction, as exemplified by the reaction between vinyl bromide and hydrogen chloride is a reversible equilibrium reaction which can be expressed as follows:

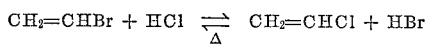

In order to drive the reaction in a particular direction it is desirable to add a stoichiometric excess of one of the reactants. Where vinyl chloride is the desired product, for example, one would obviously add an excess of hydrogen chloride. Analogous choices apply for other reactants. The reactants can thus be present in a molar ratio of from 1:1 to about 10:1, preferably from about 2:1 to about 3:1 or even outside such ranges. This ratio is not critical and is governed by the dual consideration of reaction equilibrium, requiring an excess of one of the reactants for complete reaction and reaction economics, limiting this excess to a reasonable amount.

Once the reaction is complete the effluent gas can be purified, separated and recovered in any convenient manner. One convenient method involves passing the hot effluent gas through a water scrubber to remove soluble chlorides and bromides therefrom and then fractionating the remaining halide mixture to recover a substantially pure product.

A particularly advantageous aspect of our invention is that by employing the procedure defined herein ethylene can easily be converted to vinyl chloride without the necessity of oxidizing hydrogen chloride to chlorine, as is now the practice. The oxychlorination processes currently employed oxidize hydrogen chloride in the presence of ethylene. This is necessary because the conversion of hydrogen chloride to chlorine is limited to about 60 mole percent unless a chlorine acceptor, such as ethylene, is present to remove the chlorine from its equilibrium concentration. During the oxidation process of the prior art both ethylene and hydrogen chloride are lost. Another disadvantages is that corrosion resistant materials must be used throughout all phases of the oxychlorination process. By employing the novel reaction between a vinyl halide and some other halide, whereby transhalogenation is effected, we can overcome these problems in the synthesis of vinyl chloride from ethylene. In accordance with this embodiment of our novel process, ethylene is first brominated by known procedures to form dibromoethane. This can be accomplished in any convenient manner by use of conventional techniques. In a preferred embodiment, ethylene can be quantitatively brominated with a bromine-water mixture, wherein the molar ratio of bromine to water is about 1:1 to about 2:1, at atmospheric pressure and a temperature in the range of from about 0° to about 100° C., preferably from about 40° to 60° C. The dibromoethane formed is insoluble and immiscible with water and can therefore be readily separated. This step is illustrated by the following equation:

(1) 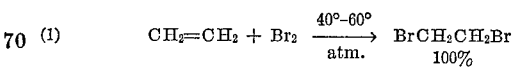

The second step in the conversion of ethylene to vinyl chloride involves the decomposition of dibromoethane to vinyl bromide and HBr and can be accomplished by known procedures. We have found that the dehydrobromination of 1,2-dibromoethane to vinyl bromide can readily be effected by thermal means. Thus, in a preferred embodiment, dibromoethane can be pyrolyzed in an empty carbon steel reactor tube at a temperature of about 350° to about 550° C. Contact times can range from about 100 to 300 seconds and can frequently be as little as 30–40 seconds; the reaction takes place quite readily with very little coke formation. Yields in this step are on the order of 90 to 95 percent vinyl bromide obtained, conversion of dibromide 99 percent and efficiencies about 95 percent.

This step is exemplified by the following equation:

(2) 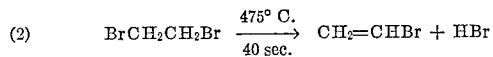

In the next step of the conversion of ethylene to vinyl chloride, the vinyl bromide can be caused to undergo transhalogenation by reaction with a suitable halide, such as hydrogen chloride, to produce vinyl chloride and hydrogen bromide, exemplified by the following equation:

(3) 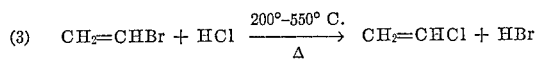

The reaction parameters for this step have already been discussed above. If trace amounts of dibromoethane are present in the vinyl bromide, the dibromoethane will also react with the hydrogen chloride to produce vinyl chloride and hydrogen bromide. The vinyl chloride produced, which boils at −14° C., can be separated from the vinyl bromide, which boils at +16° C., by distillation and the vinyl bromide can be recycled. The hydrogen chloride, having a vapor pressure of 613 p.s.i.g., and hydrogen bromide, having a vapor pressure 320 p.s.i.g., can be separated from each other at room temperature. These separations can be carried out in carbon steel equipment under anhydrous conditions. Thus, one advantage of our process is a reduction in equipment costs the need for expensive corrosion resistant equipment being significantly reduced.

To completely balance the process, the hydrogen bromide produced above can be oxidized to produce bromine and water, which can then be recycled for use in the preparation of dibromoethane as described. This step can be represented by the equation (4) 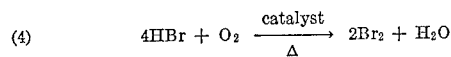

The by-product hydrogen bromide can be oxidized in several ways. We have found it most convenient to oxidize the HBr directly, in the presence of oxygen. We have found that hydrogen bromide can be directly oxidized to bromine and water without a catalyst at temperatures of about 700° C. Such temperatures pose undesirable equipment problems and it is therefore desirable to operate at lower temperatures. We have found that catalysts such as platinum, palladium, vanadium oxide and sulfur trioxide are useful in catalyzing the oxidation of hydrogen bromide at lower temperatures. Thus, we have found that the use of about 5 percent platinum on asbestos results in about 100 percent conversion of HBr at about 400° C., while at about 300 to 330° C., results of about 31 percent conversion are obtained. Results on the order of about 64 percent conversion have been obtained with the use of about 3 percent palladium on alumina at temperatures of about 350° C. We have found that a catalyst such as cuprous bromide gives particularly good results from the point of view of low temperatures and high conversions. Thus, when from 10 to about 20 percent, preferably about 15 percent of CuBr$_2$ dispersed on a suitable carrier such as silica gel is used, we have found that temperatures on the order of about 175° C. to 200° C., can be employed, resulting in about 95 percent conversion of HBr. The oxidation of HBr set forth above is the subject of applications Ser. Nos. 631,890, now U.S. Pat. No. 3,437,445, and 631,913, now abandoned, both filed Apr. 19, 1967, and assigned to the same assignee as the instant application. More detailed disclosure with respect to this aspect of the process will be found in the aforementioned applications. It is to be noted that in the described process the HBr is oxidized by itself in good yields and there is no attendant loss of materials as is the case when hydrogen chloride is oxidized in the presence of ethylene. Further, the process takes advantage of the fact that the reaction equilibrium favors the formation of bromine in excess of about 95 mole percent, whereas the conversion of hydrogen chloride in prior processes is limited to about 60 mole percent chlorine, unless a chlorine acceptor, such as ethylene, is present. A further advantage is that this oxidation step is the only part of the process requiring corrosion resistant materials.

The above sets forth a process that can involve four steps for the conversion of ethylene to vinyl chloride. It has been found, however, that the separate steps of pyrolysis of dibromoethane to vinyl bromide and reaction of vinyl bromide with HCl can be compressed into a single step, resulting in a three-step process. According to this embodiment, ethylene is brominated as before and the resultant 1,2-dibromoethane is reacted directly with HCl in a tubular reactor at a temperature in the range of about 250° to about 550° C., preferably about 400° to about 500° C. The products, vinyl chloride, hydrogen bromide, vinyl bromide and hydrogen chloride can readily be separated by distillation and the vinyl bromide and hydrogen chloride recycled. The three-step process can be represented by the following equations:

(5) 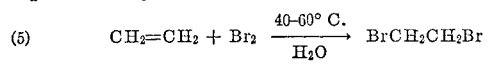

(6) 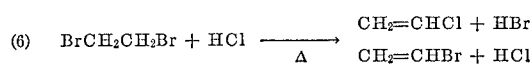

(7) 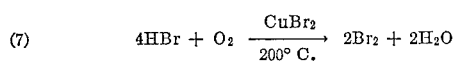

The more detailed operation of our invention is illustrated by the following description of the preferred embodiments. There are, of course, many forms of this invention obvious to one skilled in the chemical art once the invention has been revealed and it will accordingly be understood that these examples are illustrative of our invention and not limitations thereon.

DESCRIPTION OF THE PREFERRED EMBODIMENTS

EXAMPLE I

This example illustrates the bromination of ethylene with bromine water.

252.8 grams of water (14.1 moles) and 37.2 grams of bromine (0.233 mole) were charged to a 1-liter 3-necked flask equipped with a gas inlet tube, cold water condenser, Dry Ice condenser and a magnetic stirrer. The flask was placed in a cooling bath so as to facilitate control of the reaction temperature. The Dry Ice condenser was connected to a water trap to collect any HBr which might be contained in the bromide and the flask was purged with nitrogen for 10 minutes to remove any HBr. Ethylene was added through the gas inlet tube to the stirred reaction mixture. The temperature was maintained between about 30–40° C. The ethylene reacted quantitatively with the bromide and caused a complete removal of the reddish bromide color after a reaction time of 65 minutes. The 1,2-dibromoethane, 43.82 grams (0.233 mole), was separated from the water and dried. The amount of ethylene reacted to form the 1,2-dibromoethane was 6.52 grams (0.233 mole).

EXAMPLE II 1,2-dibromoethane, prepared as set forth in Example I above, can be dehydrobrominated by pyrolysis to yield vinyl bromide. Thus, 600.2 grams (3.20 moles) of 1,2-dibromoethane were pyrolyzed in a 1" diameter reactor tube having a volume of 243 cc. at a temperature of 475° C.

| | |
|---|---|
| Temperature° C | 475 |
| Reactor tube vol., cc | 243 |
| Contact time, sec | 41 |

| | Grams | Moles |
|---|---|---|
| Weight balance: Dibromoethane | 600.2 | 3.20 |
| Products: | | |
| HBr | 262.4 | 3.25 |
| Vinyl bromide | 324.5 | 3.03 |
| Ethylene | 5.1 | .18 |
| Dibromoethane | 3.2 | .02 |
| Higher bromides | 1.8 | |
| Hydrogen | .004 | .002 |
| Methane | .64 | .04 |
| Carbon monoxide | 2.2 | .08 |
| Carbon | .3 | |
| Weight percent recovery | 100 | |
| Vinyl bromide yield, mole percent | 94.8 | |
| Dibromoethane: | | |
| Conversion, mole percent | 99.4 | |
| Efficiency, mole percent | 95.3 | |

EXAMPLE III

Dibromoethane was pyrolyzed under conditions substantially similar to those of Example II except that a reactor tube having a 3½" diameter and a volume of 2840 cc. was used.

| | |
|---|---|
| Temperature, ° C | 475 |
| Reactor tube vol., cc | 2,840 |
| Contact time, seconds | 240 |

| | Grams | Moles |
|---|---|---|
| Weight blaance: Dibromoethane | 1,208.9 | 6.43 |
| Products: | | |
| HBr | 539.8 | 6.67 |
| Vinyl bromide | 637.5 | 5.96 |
| Ethylene | 13.4 | .48 |
| Dibromoethane | 6.1 | 0.3 |
| Higher bromides | 1.2 | |
| Hydrogen | .04 | .02 |
| Methane | .48 | .03 |
| Carbon monoxide | 1.96 | .07 |
| Carbon | .25 | |
| Weight percent recovery | 99.3 | |
| Vinyl bromide yield, mole percent | 92.8 | |
| Dibromoethane: | | |
| Conversion, mole percent | 99.5 | |
| Efficiency, mole percent | 93.1 | |

The contact time in this larger reactor could not be reduced because of heat transfer problems. It is seen, from Examples II and III, that vinyl bromide can be prepared in good yields, conversions and efficiencies from 1,2-dibromoethane in equipment no more complex than a reactor tube.

EXAMPLE IV

A 1" x 18" glass reactor tube, having an 8 mm. thermowell at the center running the full length of the tube, was filled with glass helices. The glass reactor tube was placed inside an electrical resistance furnace. At a reactor temperature of 500° C., there was charged to the reactor .302 mole of vinyl bromide and 1.0 mole of hydrogen chloride over a period of 2⅓ hours. The reaction product was water scrubbed to remove 44.7 grams of acid gas. The scrubbed gas amounting to 23.1 grams was collected in a Dry Ice trap. Chromatographic analysis indicated that this gas contained 64.5 mole percent of vinyl chloride and 35.5 mole percent vinyl bromide.

EXAMPLE V

A glass reactor tube 1" x 20" was filled with glass helices (⅛" I.D.) 139.9 grams (1.305 moles) of vinyl bromide and 68.7 grams (1.88 moles) of HCl were charged to the reactor over a 5½ hour period. The mean temperature of the reactor was 475° C. The HCl/vinyl bromide mole ratio was 1.45. The product was condensed in a Dry Ice trap and found to contain 17.5 mole percent vinyl chloride and 82.5 mole percent vinyl bromide by gas chromatographic analysis.

EXAMPLE VI

A glass reactor tube 1" x 20" was filled with glass helices (⅛" I.D.) 32.3 grams (.302 mole) of vinyl bromide and 36.5 grams (1.0 moles) of HCl were charged to the reactor at a mean temperature of 500° C. over a 2⅓ hour period. The HCl/vinyl bromide mole ratio was 3.3. The product was condensed in a Dry Ice trap and found to contain 64.5 mole percent of vinyl chloride and 35.5 mole percent of vinyl bromide by gas chromatographic analysis.

EXAMPLE VII

A reactor tube 1" x 20" was filled with glass helices (⅛" I.D.) 29.3 grams (.274 mole) of vinyl bromide and 26.8 grams (.735 mole) of HCl were charged to the reactor at a mean temperature of 525° C., over a 1⅚ hour period. The HCl/vinyl bromide mole ratio was 2.7. Gas chromatographic analysis of the product indicated the contents to be 66.5 mole percent of vinyl chloride and 33.5 mole percent of vinyl bromide.

EXAMPLE VIII

A reactor tube 1" x 16" was filled to be a depth of 12½" with activated alumina followed by a 3½" preheat section of Raschig rings. 7.0 grams of vinyl bromide (.0655 mole) and 14.8 grams of HCl (.406 mole) were charged to the reactor at a mean temperature of 415° C. over a ¾ hour period. The HCl/vinyl bromide ratio was 6.2. The product, condensed in a Dry Ice trap, was found, by gas chromatographic analysis to contain 89.9 mole percent vinyl chloride and 10.1 mole percent vinyl bromide.

EXAMPLE IX

A reactor tube prepared as in Example VIII above was charged with 5.9 grams (.0551 mole) of vinyl bromide and 7.1 grams (.195 mole) of HCl over a ½ hour period. The mean reactor temperature was 405° C. the HCl/vinyl bromide ratio was 3.54. The product was condensed in a Dry Ice trap and found to contain 84.0 mole percent of vinyl chloride and 16.0 mole percent vinyl bromide by gas chromatographic analysis.

EXAMPLE X

A reactor tube, prepared as in Example VIII, was charged with 12.5 grams (.117 mole) of vinyl bromide and 14.6 grams (.40 mole) of HCl over a 1 hour period. The mean reactor temperature was 370° C., and the HCl/vinyl bromide mole ratio was 3.42. Gas chromatographic analysis of the product indicated the contents to be 83.3 mole percent vinyl chloride and 16.7 mole percent vinyl bromide.

EXAMPLE XI

A 1" x 16" reactor tube was filled with silica gel to a depth of 12" followed by a 4" preheat section of Raschig rings. 3.5 grams (.0327 mole) of vinyl bromide and 3.9 grams (.107 mole) of HCl were charged to the reactor at a mean temperature of 365° C., over a ¼ hour period. The HCl/vinyl bromide ratio was 3.27. The product analyzed as in the other examples, contained 29.6 mole percent of vinyl chloride and 70.4 mole percent of vinyl bromide.

EXAMPLE XII

A 1" x 16" reactor tube was filled to a depth of 11½" with silica gel containing 10 weight percent of $CuCl_2$, followed by a 4½" preheat section of Raschig rings. 8.7 grams (.0813 mole) of vinyl bromide and 18.7 grams (.513 mole) of HCl were charged to the reactor at a mean temperature of 270° C., over a ½ hour period. The HCl/vinyl bromide mole ratio was 6.31. The product contained 32.4 mole percent of vinyl chloride and 67.6 mole percent of vinyl bromide.

EXAMPLE XIII

A reactor tube prepared as in Example XII was charged with 13 grams (.121 mole) of vinyl bromide and 13.4 grams (.37 mole) of HCl over a period of 1 hour and a mean temperature of 355° C. The HCl/vinyl chloride ratio was 3.0. The product contained 48.9 mole percent vinyl chloride and 51.1 mole percent vinyl bromide.

EXAMPLE XIV

A reactor tube 1″ x 16″ was filled to a depth of 12″ with silica gel containing 10 weight percent of $AlCl_3$. 29.0 grams (.27 mole) of vinyl bromide and 38.0 grams (1.04 moles) of HCl were charged to the reactor at a mean temperature of 200° C. over a 1⅙ hour period. The HCl/vinyl bromide mole ratio was 3.9. The product, condensed in a Dry Ice trap, contained 12.4 mole percent vinyl chloride, 73.5 mole percent vinyl bromide, 3.5 mole percent ethyl bromide and 10.0 mole percent of heavy material which was not identified.

EXAMPLE XV

An unpacked Vycor reactor, 1″ x 24″ was treated with dichloroethane at coking temperatures (550°–600° C.) to produce a carbon surface on the wall of the reactor. Vinyl bromide 46.1 grams (0.383 mole) was reacted with 31.4 grams (0.862 mole) of HCl in this reactor at an average temperature of 500° C., over a period of 4 hours. The gas volume ratio of HCl/vinyl bromide was 2.25/1. The product was analyzed by gas chromatography and was found to contain 52 mole percent of vinyl chloride and 48 mole percent of vinyl bromide. The carbon coating on the surface of the reactor walls insured that no catalytic effect was being exerted by the reactor itself.

EXAMPLE XVI

A glass reactor tube 1″ x 20″ was filled with glass helices (⅛″ I.D.). A 74.4 gram mixture containing 17.5 mole percent vinyl chloride and 82.5 mole percent vinyl bromide and 91.9 grams (2.52 moles) of HCl were charged to this reactor at a mean temperature of 475° C., over a 3¾ hour period. The HCl/vinyl bromide mole ratio was 4.1/1. The product was condensed in a Dry Ice trap and found to contain 23.6 mole percent vinyl chloride and 76.4 mole percent vinyl bromide.

EXAMPLE XVII

A glass reactor tube 1″ x 20″ was filled with glass helices. A 48.1 gram mixture containing 23.6 mole percent vinyl chloride and 76.4 mole percent vinyl bromide and 27.7 grams (.76 mole) of HCl were charged to the reactor at a mean temperature of 500° C., over a 2 hour period. The HCl/vinyl bromide mole ratio was 2:1. The product was found to contain 65 mole percent of vinyl chloride and 35 mole percent of vinyl bromide.

In each of the above examples the amount of carbon formed during the reaction was small and there was no evidence of polymerization. It is thus seen that by the practice of this invention vinyl bromide either alone or in admixture with vinyl chloride can be converted in good yield to vinyl chloride. Stated another way, it is seen that the transhalogenation reaction is operable over a wide range of conditions.

The following six examples illustrate the proposition that the transhalogenation reaction is an equilibrium reaction and that either of vinyl bromide or vinyl chloride can be prepared in this manner.

EXAMPLE XVIII

An unpacked carbon steel reactor tube was charged with vinyl chloride 10.9 grams (0.174 mole) and HBr 29.4 grams (0.365 mole) at an average temperature of 499° C., over a period of one hour. The gas volume ratio of the HBr/vinyl chloride was 2.1:1. The product contained 53.3 mole percent of vinyl bromide and 46.7 mole percent of vinyl chloride.

EXAMPLE XIX

A carbon steel reactor tube 1″ x 18″ was charged with 11.2 grams of vinyl chloride (0.179 mole) and 18.5 grams of HBr (0.229 mole) at an average temperature of 499° C., over a period of 1 hour. The gas volume ratio of HBr/vinyl chloride was 1.28:1. The product contained 49.3 mole percent vinyl bromide and 50.7 mole percent vinyl chloride.

EXAMPLE XX

A carbon steel reactor tube 1″ x 18″ was charged with 15.7 grams (0.147 mole) of vinyl bromide and 16.6 grams (0.455 mole) of hydrogen chloride at an average temperature of 498° C., over a period of 1 hour. The gas volume ratio of the HCl/vinyl bromide was 3.1:1. The product contained 68.5 mole percent vinyl chloride and 31.5 mole percent vinyl bromide.

EXAMPLE XXI

A Pyrex glass reactor tube 1″ x 18″ was charged with vinyl chloride and HBr over a period of five hours. The average reactor temperature was 500° C. The gas volume ratio of HBr/vinyl chloride was 2:1. The product contained 74 mole percent of vinyl bromide and 26 mole percent of vinyl chloride. The amount of carbon formed in the reaction was so slight as to be incapable of measurement.

EXAMPLE XXII

A Vycor tube reactor 1″ x 18″ was packed with Vycor glass chips. 171.5 grams (1.60 moles) of vinyl bromide and 175.2 grams (4.80 moles) of HCl were charged over a period of 4½ hours. The average reactor temperature was 500° C. The gas volume ratio of the HCl/vinyl bromide was 3:1. The product consisted of 62 mole percent of vinyl chloride and 38 mole percent of vinyl bromide.

EXAMPLE XXIII

A Vycor tubular reactor 1″ x 18″ was packed with Vycor glass chips. 25.2 grams of vinyl chloride (0.690 mole) and 167.5 grams of HBr (2.07 moles) were charged over a period of six hours. The average reactor temperature was 500° C. The gas volume ratio of the HBr/vinyl chloride was 3:1. The product contained 76 mole percent vinyl bromide and 24 mole percent vinyl chloride.

It is apparent from the six examples above that the halogen interchange reaction is a reversible equilibrium reaction. It is further apparent that the reaction can be maintained in inexpensive equipment without the attendant corrosion problems found in other processes.

EXAMPLE XXIV 2.23 parts by weight of n-octyl bromide were contacted with 2 parts by weight of KI at 245° C., in a Pyrex tube equipped with a thermometer and an air condenser. The reaction mixture was thus refluxed for one hour. The KI/octyl bromide mole ratio was 1.04. The resulting octyl halide mixture consisted of 18.5 mole percent of octyl bromide and 81.5 mole percent of octyl iodide.

EXAMPLE XXV

Two parts by weight of potassium bromide and 1.76 parts by weight n-octyl chloride were contacted at 235° C. for 1 hour as in the above example. The KBr/octyl chloride mole ratio was 1.42. The resulting octyl halide mixture was 89.9 mole percent octyl chloride and 10.1 mole percent octyl bromide.

EXAMPLE XXVI 2.23 parts by weight of normal octyl bromide and 2 parts by weight of NaCl were contacted at 238° C. for 1 hour. The NaCl/octyl bromide mole ratio was 2.98. The octyl halide mixture resulting contained 68.8 mole percent octyl chloride and 31.2 mole percent octyl bromide.

EXAMPLE XXVII 2.23 parts by weight of normal octyl bromide were contacted with 2 parts by weight of BaCl₂ for 1 hour at 237° C. The BaCl₂/octyl bromide mole ratio was 0.84. The resulting octyl halide mixture contained 74.4 mole percent octyl chloride and 25.6 mole percent octyl bromide.

EXAMPLE XXVIII

This example illustrates the transhalogenation of an aromatic compound.

46.5 grams (0.296 mole) of bromobenzene were contacted with 15.3 grams (0.421 mole) of HCl in a glass reactor at a mean temperature of 494° C., for a period of nine seconds. The HCl/bromobenzene mole ratio was 1.42. The resulting product contained 22 mole percent chlorobenzene and 78 mole percent of bromobenzene. It is thus seen that aromatic halides can be made to undergo transhalogenation in the same way and under the same conditions as the aliphatic halides.

The experiments set forth above are summarized in Table 1, below. From an examination of the table it is apparent that a wide variety of compounds can be made to interchange halogen under a wide range of reaction conditions and that compounds previously available only with difficulty can now be had directly and simply.

Obviously, many modifications and variations of the invention, as hereinabove set forth, can be made without departing from the spirit and scope thereof, and therefore only such limitations should be imposed as are indicated in the appended claims.

We claim:

1. A process comprising contacting a first halide selected from the group consisting of alkenyl chlorides and bromides having from 2 to 14 carbon atoms with a second halide selected from the group consisting of hydrogen chloride and hydrogen bromide, wherein the halogen on each of said reactants is different, at a temperature of from about 200° C. to about 600° C., whereby halogen interchange between said compounds is obtained.

2. A process according to claim 1 in which the halogen substituent on said first halide is bromine and the halogen on said second halide is chlorine.

3. A process according to claim 1 in which said contact is made at a temperature of from about 250° C. to about 500° C.

4. A process according to claim 1 in which said first compound is vinyl bromide and said second compound is hydrogen chloride and said contact is made at a temperature of from about 250° C. to about 500° C., said hydrogen chloride being present excess.

5. A process according to claim 1 in which said first halide is vinyl chloride and said second compound is hydrogen bromide.

TABLE 1

| Example | Reactants | Packing or catalyst | Temp. (° C.) | Time¹ (hrs.) | Product | Yield, mole percent | Mole ratio, inorganic halide/ organic halide |
|---|---|---|---|---|---|---|---|
| IV | CH₂=CHBr plus HCl | Glass helices | 500 | 2½ | CH₂=CHCl | 64.5 | 3.3 |
| V | Same as above | do | 475 | 5⅓ | Same as above | 17.5 | 1.45 |
| VI | do | do | 500 | 2⅓ | do | 64.5 | 3.3 |
| VII | do | do | 525 | 1⅚ | do | 66.5 | 2.7 |
| VIII | do | Activated alumina plus Raschig rings | 415 | ¾ | do | 89.9 | 6.2 |
| IX | do | do | 405 | ½ | do | 84.0 | 3.54 |
| X | do | do | 370 | 1 | do | 83.3 | 3.42 |
| XI | do | Silica gel plus Raschig rings | 365 | ¼ | do | 29.6 | 3.27 |
| XII | do | Silica gel plus 10% CuCl₂ plus Raschig rings | 270 | ½ | do | 32.4 | 6.31 |
| XIII | do | do | 355 | 1 | do | 48.9 | 3.0 |
| XIV | do | Silica gel plus 10% AlCl₃ plus Raschig rings | 200 | 1½ | do | 12.4 | 3.9 |
| XV | do | Carbon coating | 500 | 4 | do | 52 | 2.2₅ |
| XVI | {CH₂=CHCl plus HCl / CH₂=CHBr plus HCl} | Glass helices | 475 | 3¾ | do | 23.6 | 4.1 |
| XVII | {CH₂=CHCl plus HCl / CH₂=CHBr plus HCl} | do | 500 | 2 | do | 65 | 2 |
| XVIII | CH₂=CHCl plus HBr | None | 499 | 1 | CH₂=CHBr | 53.3 | 2.1 |
| XIX | Same as above | do | 499 | 1 | Same as above | 49.3 | 1.2₅ |
| XX | CH₂=CHBr plus HCl | do | 498 | 1 | CH₂=CHCl | 68.5 | 3.2 |
| XXI | CH₂=CHCl plus HBr | do | 500 | 5 | CH₂=CHBr | 74 | |
| XXII | CH₂=CHBr plus HCl | Vycor chips | 500 | 4½ | CH₂=CHCl | 62 | 3 |
| XXIII | CH₂=CHCl plus HBr | do | 500 | 6 | CH₂=CHBr | 76 | 3 |
| XXIV | {n-Octyl bromide / KI} | None | 245 | 1 | {Octyl iodide / Octyl bromide} | {81.5 / 18.5} | 1.04 |
| XXV | {n-Octyl chloride / KBr} | do | 235 | 1 | {Octyl bromide / Octyl chloride} | {10.1 / 89.9} | 1.42 |
| XXVI | {n-Octyl bromide / NaCl} | do | 238 | 1 | {Octyl chloride / Octyl bromide} | {68.8 / 31.2} | 2.98 |
| XXVII | {n-Octyl bromide / BaCl₂} | do | 237 | 1 | {Octyl chloride / Octyl bromide} | {74.4 / 25.6} | .84 |
| XXVIII | Bromobenzene plus HCl | do | 494 | 3 | {Chlorobenzene / Bromobenzene} | {22 / 78} | 1.42 |

¹ Time in this table refers to total reaction time. Contact time is typically a matter of seconds, as previously discussed.

References Cited

Doering et al., J. Am. Chem. Soc., 74, pp. 5683–5687 (1952).

Doering et al., J. Am. Chem. Soc. 74, pp. 5688–5693 (1952).

Hertog et al., Recueil 70 (1951) pp. 182–190.

Staudinger et al., Ber. 46 (1913) pp. 1417–1426.

HOWARD T. MARS, Primary Examiner

U.S. Cl. X.R.

260—290, 332.5, 346.1, 346.2, 649, 650, 654, 658, 660

PO-1050
(5/69)

UNITED STATES PATENT OFFICE
CERTIFICATE OF CORRECTION

Patent No. 3,577,471      Dated May 4, 1971

Inventor(s) John G. McNulty and William L. Walsh

It is certified that error appears in the above-identified patent and that said Letters Patent are hereby corrected as shown below:

Column 6, line 66, "bromide" should be "bromine".

Table 1, 5th column of Example V, "5-1/3" should read "5-1/2".

Signed and sealed this 3rd day of August 1971.

(SEAL)
Attest:

EDWARD M. FLETCHER, JR.       WILLIAM E. SCHUYLER, JR.
Attesting Officer      Commissioner of Patents